United States Patent
Thorne

(10) Patent No.: US 8,416,331 B2
(45) Date of Patent: Apr. 9, 2013

(54) IMAGING DEVICE AND METHOD FOR PROCESSING IMAGE DATA OF A LARGE AREA ARRAY

(75) Inventor: Peter Michael Thorne, Romsey (GB)

(73) Assignee: Selex Galileo Limited, Basildon, Essex (GB)

(*) Notice: Subject to any disclaimer, the term of this patent is extended or adjusted under 35 U.S.C. 154(b) by 0 days.

(21) Appl. No.: 12/742,877

(22) PCT Filed: Dec. 9, 2008

(86) PCT No.: PCT/GB2008/004052
§ 371 (c)(1),
(2), (4) Date: May 13, 2010

(87) PCT Pub. No.: WO2009/066092
PCT Pub. Date: May 28, 2009

(65) Prior Publication Data
US 2010/0289934 A1 Nov. 18, 2010

(30) Foreign Application Priority Data
Nov. 19, 2007 (GB) .................................. 0722643.4

(51) Int. Cl.
*H04N 3/14* (2006.01)
*H04N 5/335* (2011.01)

(52) U.S. Cl. ........................................ 348/302

(58) Field of Classification Search .................. 348/302
See application file for complete search history.

(56) References Cited

U.S. PATENT DOCUMENTS
6,735,341 B1 * 5/2004 Horie et al. .................. 382/239

(Continued)

FOREIGN PATENT DOCUMENTS
| EP | 0 265 302 A1 | 4/1988 |
| EP | 1 499 112 A2 | 1/2005 |
| EP | 1 659 776 A1 | 5/2006 |

OTHER PUBLICATIONS

Notification of Transmittal of the International Search Report and the Written Opinion of the International Searching Authority (Forms PCT/ISA/220, PCT/ISA/210 and PCT/ISA/237) Issued in the corresponding International Application No. PCT/GB2008/004052 dated Apr. 2, 2009.
International Search Report (PCT/ISA/210) dated Apr. 2, 2009.

*Primary Examiner* — Usman Khan
(74) *Attorney, Agent, or Firm* — Buchanan Ingersoll & Rooney PC

(57) ABSTRACT

An imaging device is capable of on-chip processing data output by a series of pixels 1, 2, 16. The pixels 1, 2, 16 are arranged into a series of super pixels or tiles that together form a large area array. The pixels 1, 2, 16 are arranged into two groups, nominally group A (odd pixels) and group B (even pixels). Data from the individual pixels 1, 2, 16 is read out according to the relative position of the pixel within each group. The technique employed by the device allows the array data rate to be controlled dynamically by the super pixel information content. The output data bandwidth is increased at the expense of image spatial resolution where scene content contains large uniform areas (e.g. desert, sea, sky) that would otherwise generate huge amounts of similar data that carries little additional information.

9 Claims, 2 Drawing Sheets

U.S. PATENT DOCUMENTS

| | | | |
|---|---|---|---|
| 6,801,258 B1 * | 10/2004 | Pain et al. | 348/302 |
| 6,868,322 B2 | 3/2005 | Stam et al. | |
| 7,068,316 B1 | 6/2006 | Pine | |
| 2003/0193593 A1 * | 10/2003 | Lee et al. | 348/302 |
| 2004/0095492 A1 | 5/2004 | Baxter et al. | |
| 2005/0012968 A1 | 1/2005 | McCaffrey | |
| 2005/0046723 A1 * | 3/2005 | Bean et al. | 348/315 |
| 2005/0103977 A1 | 5/2005 | Krymski | |
| 2005/0206752 A1 | 9/2005 | Lim | |
| 2006/0113459 A1 | 6/2006 | Yang et al. | |

* cited by examiner

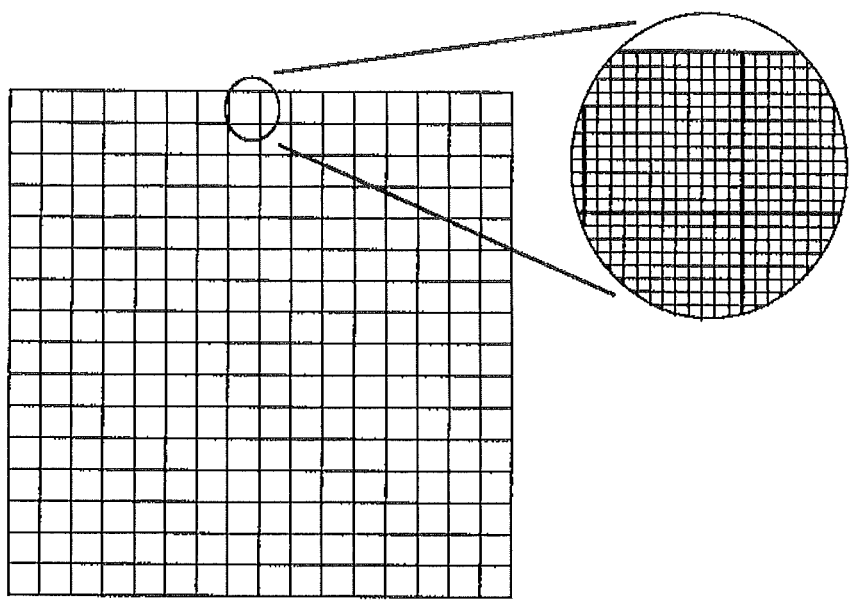
Figure 1
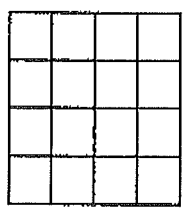 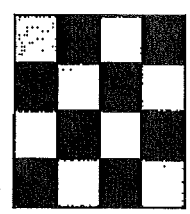
Figure 2a　　　　　　　　　　　Figure 2b

IMAGING DEVICE AND METHOD FOR PROCESSING IMAGE DATA OF A LARGE AREA ARRAY

This invention relates to an imaging device and method. More particularly but not exclusively, the invention relates to large area arrays that typically generate large amounts of data for processing in real time or at high frame rates.

Pixel arrays are intrinsic to imaging sensors. In 1999, such large area arrays were modified to form large area pixels. Interconnecting switches allowed a 12×12 array of individual 29 µm pixels to be joined together into a tile or super pixel. Pixels are enabled under memory control allowing individual elements to be switched in or out. In this configuration, implementing fewer super pixels on the chip and by combining their individual signals into fewer data elements, both the large pixel area requirement and reduced quantity of output data, allowing very high frame rates to be achieved for this detector, are met.

For large format arrays, read out times can tend to be slow but can be improved by reading out fewer pixels (i.e. sampling) or by combining individual pixel signals in a tile to form a super pixel. (i.e. averaging). However, as the information being collected is not known prior to readout, then information can easily be lost.

Accordingly, there is provided an imaging device for producing an image of a scene, comprising a series of tiles, said tiles comprising a series of pixels arranged into at least two groups by interconnecting switches, allowing signal information at pixel level to be shared using sample and hold and charge sharing circuits, the device further comprising a comparator to provide in pixel signal processing within each tile and independently of all other tiles, such that the imaging device data rate is controlled dynamically by the tile information content.

In this way the disadvantages of the prior art are overcome and improved frame rates can be achieved for a given large area array.

The invention will now be described by way of example and with reference to the accompanying drawings, in which:

FIG. 1 is a schematic view of a large area array, the array comprising 16×16 tiles or super pixels, each tile or super pixel comprising 12×12 pixels;

FIG. 2a is a schematic view of one tile or super pixel, the tile or pixel comprising 4×4 pixels; however, any number of pixels in a suitable array may be considered.

FIG. 2b is a schematic view of the super pixel of FIG. 2a, showing the pixel signal grouping into odd (A) and even (B) pixels.

Figure 3:
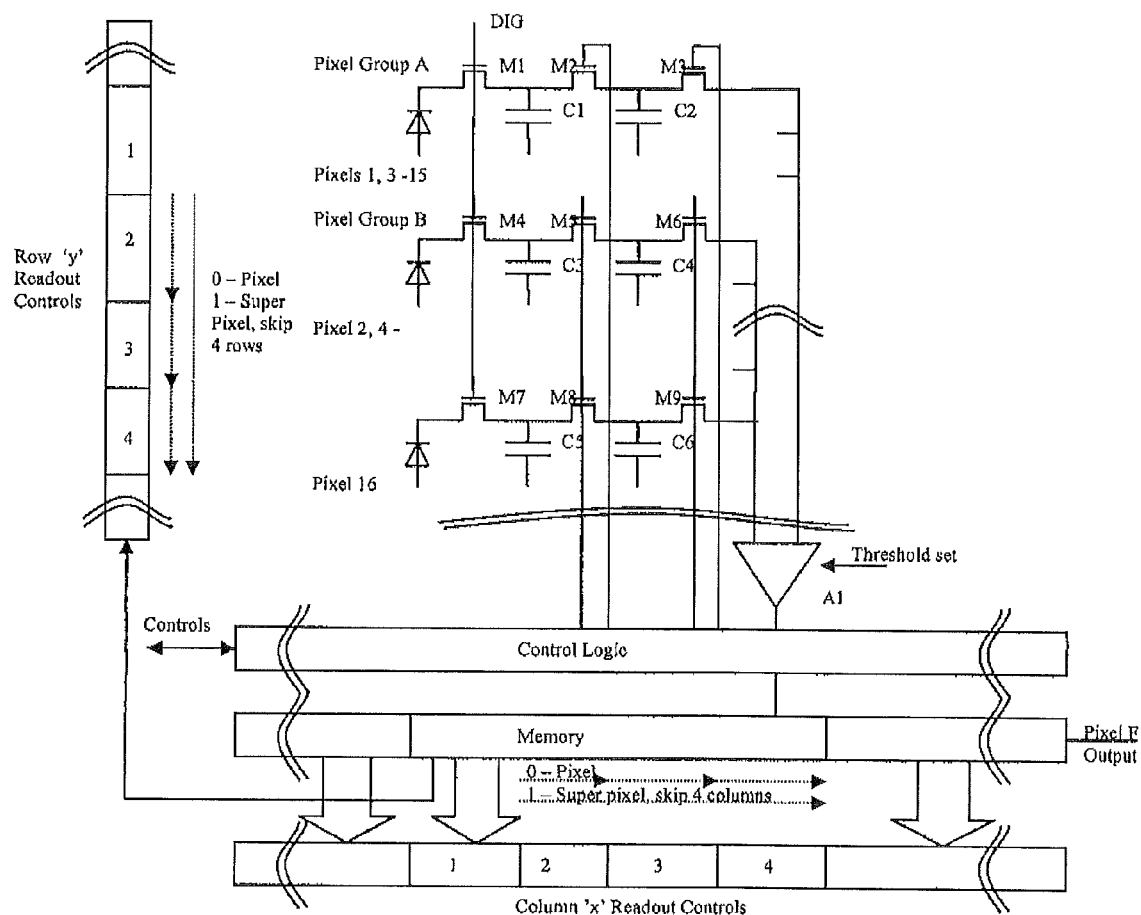
FIG. 3 is a schematic effective circuit diagram showing key circuit elements of the super pixel and associated signal processing circuits.

In the embodiment of the invention described below, a super pixel of the format shown in FIGS. 2a and 2b i.e. 4×4 pixels in a checkerboard grouping is used in collaboration with the circuitry elements described below. FIG. 2a shows an example tile of 16 pixels. Pixel signals are joined into two groups using interconnecting switches. Odd and even pixels are grouped A and B in a checkerboard pattern figure as shown in FIG. 2b. The super pixel size can be set to satisfy sampling or array size requirements. FIG. 3 shows the key circuit elements of the super pixel and associated signal processing circuits. Note that for clarity, reset and readout transistor circuitry have been omitted. The control logic and comparator amplifier are implemented outside of the pixel block and are repeated for each super pixel instance in the column.

Three of the sixteen pixels are shown in FIG. 3, two pixels from group B (even pixels 2, 16) and one pixel from group A (odd pixels 1). Each individual pixel 1, 2, 16 operates using the direct injection technique. When sample and hold gates M1, M4 and M7 etc. are biased, by pulsing the Direct Inject Gate DIG voltage with the sample and hold gates M2, M5 and M8 etc. operated, the photo current is integrated onto the storage capacitors C1 and C2, C3 and C4, C5 and C6 etc. to form a signal voltage on each pair of capacitors.

Having acquired the pixel signals, the sample and hold gates M2, M5 and M8 are closed. Conventional readout architecture is used where each row is addressed and the column data is readout in turn, but an additional pre-processing operation is introduced at the row start. As each row is addressed, pixel signals in each super pixel need to be compared to determine variation in scene content, to determine either pixel or super pixel level readout. For the even pixels 2, 16 gates M6, M9 etc . . . are operated and the signal charge is shared between the sample and hold capacitors C4, C6 etc. The resulting shared signal voltage will be present across all hold capacitors M6, M9 etc . . . . The charge is shared similarly between the odd pixels 1, 15. The shared signal voltages for the odd and even pixels are compared by the variable threshold comparator A1. A threshold setting control input to A1 is used globally to set the range of signal variance by the user. Signal variances in the pixel above the threshold will set the comparator output.

Comparator results from each of the super pixel columns in the array are stored in column memory to control the row and column readout operation. The comparator result controls the column readout to operate at single pixel level if there is image scene content above the threshold or to address the super pixel level signal and skip ahead 4 columns to the next super pixel if there is not. Similarly, the row address is controlled to address rows at pixel or super pixel level if columns in the super pixel row are to be addressed at pixel level. The column address memory is retained and used to control the column readout for each of the 4 rows in a super pixel if row addressing is at pixels rather than super pixels level. A digital output data format flag indicates pixel or super pixel readout allowing registration of the data to the scene to be made.

Defective pixels would bias the operation of the signal sharing operation and are excluded by using additional switches (not shown for clarity) to deselect the defective pixel only.

Adding in-pixel signal processing controls allows the super pixel size and data output to be set by scene content. In the absence of significant pixel-to-pixel scene variation, the super pixel scene average can be output. Conversely, where some pixel to pixel variation is detected, individual pixels are output. Variable scene content translates to variable output data rates. A typical scene is expected to comprise a mixture of detail and uniform image data that when aggregated will result in an overall improvement in frame rate compared to outputting all pixel data. In limiting cases with high scene content, however, the frame rate must be expected to slow down to a certain extent to allow the scene detail to be output.

With reference to the above invention and all its proposed embodiments, all pixel interconnecting switches are always operated in unison. The in pixel signal processing and comparator output are used to process information (sample and hold and charge share), make a decision (comparator) and control (column memory). Tile or pixel info is output from the column memory input into the column readout control that then addresses either the pixel data of the tile data.

The architecture described above allows the following additional functions to be implemented. It will be appreciated that these functions are additional to the embodiment of the invention described thus far and should not be considered to be limiting.

It will be appreciated that pixel or super pixel operation can be forced to allow operation at low frame rate for detail or higher rate with reduced detail. These modes may be interleaved for arbitrary durations to provide high bandwidth or high resolution information at different rates. The readout may be combined with windowing to provide high resolution readout of regions of interest.

Furthermore, the sample and hold circuits may be operated to re-readout the data allowing super pixel readout to be followed with pixel level readout at the expense of a small reduction in signal voltage. When used in combination with windowing, this enables selected areas of interest to be read out again but at higher resolutions. For clarity, windowing is a technique that allows a patch within the full frame area to be addressed and output.

Moreover, the sample and hold capacitors may be operated to store the previous frame of data by disabling the capacitor reset. By using an additional switch, image data between frame 'n' and 'n−1' may be connected to the comparator. The comparator output signal can be used to identify changes in scene. In practice the Read-Out Integrated Circuit (ROIC) can be used to identify changes in scene content above a threshold between successive frames.

Furthermore, the circuit of FIG. 3 is operated to charge share integrated scene image data continuously frame by frame. The pixel readout is compared to the scene average allowing the ROIC to detect differences between current and historical scene content.

Accordingly, it will be appreciated that by providing in-pixel signal processing, that can be used to detect and control the interconnecting switch operation within each super pixel and independently of other super pixels, removes the need to sample or average information generated by the individual pixels. This technique allows the array data rate to be controlled dynamically by the super pixel information content. The output data bandwidth is increased at the expense of image spatial resolution where scene content contains large uniform areas (e.g. desert, sea, sky) that would otherwise generate huge amounts of similar data that carries little additional information.

In the manner described above, the not insignificant amount of data generated by the pixels 1, 2, 16 can be processed on-chip leading to faster processing times and an improvement in the frame rate achieved by the device.

It will be appreciated that in the embodiments described above, any suitable number of tiles or super pixels may be envisaged. Furthermore, any number of pixels may be used to define a tile or super pixel. The invention is not limited to the specific numbers of pixels or super pixels described above.

The invention claimed is:

1. An imaging device for producing an image of a scene, comprising:
a series of tiles, said tiles comprising a series of pixels arranged into at least two groups by interconnecting switches, allowing signal information at pixel level to be shared using sample and hold and charge sharing circuits; and
a comparator to provide in pixel signal processing within each tile and independently of all other tiles, such that the imaging device data rate is controlled dynamically by tile information content,
wherein the comparator comprises a series of sample and hold circuits for sampling and holding consecutive frames of data, the sample and hold circuits including a comparator and being operated to re-readout data allowing a tile readout to be followed with pixel level readout at the expense of a small reduction in signal voltage.

2. The imaging device according to claim 1, in which output data bandwidth is increased at the expense of image spatial resolution where scene content contains large uniform areas.

3. The imaging device according to claim 1, in which pixel or tile operation is capable in one of two modes, a first mode where operation at low frame rates is allowed to attain image detail or a second mode where operation at high frame rates is allowed with reduced detail.

4. The imaging device according to claim 3, in which the modes may be interleaved for arbitrary durations to provide high bandwidth or high resolution information at different rates.

5. The imaging device according to claim 1, in which a readout may be combined with windowing to provide high resolution readout of regions of interest.

6. The imaging device according to claim 1, in which re-readout of the data in conjunction with sample windowing enables selected areas of interest to be read out repeatedly but at higher resolutions.

7. The imaging device according to claim 1, in which the sample and hold circuits further comprise: sample and hold capacitors, the capacitors being operated so as to store the previous frame of data by disabling capacitor reset such that the comparator output signal can be used to identify changes in the scene.

8. The imaging device according to claim 7, in which the sample and hold circuit is operated to charge share integrated scene image data continuously frame by frame, the pixel readout being compared to the scene average allowing the device to detect differences between current and historical scene content.

9. A method of capturing an image, comprising:
arranging a series of pixels, contained within a series of tiles, into at least two groups by interconnecting switches to share signal information at a pixel level using sample and hold circuits; and
processing pixel signals within each tile independently of other tiles to dynamically control imaging device data by tile information content by sampling and holding consecutive frames of data, wherein data is re-readout allowing a tile readout to be followed with pixel level readout at the expense of a small reduction in signal voltage.

* * * * *